United States Patent [19]
Cho

[11] Patent Number: 5,717,309
[45] Date of Patent: Feb. 10, 1998

[54] DUAL BATTERY CHARGING DEVICE

[75] Inventor: Jae-Hong Cho, Anyang-si, Rep. of Korea

[73] Assignee: SamSung Electronics Co., Suwon, Rep. of Korea

[21] Appl. No.: 738,778

[22] Filed: Oct. 29, 1996

[30] Foreign Application Priority Data

Oct. 30, 1995 [KR] Rep. of Korea ............... 38055/1995

[51] Int. Cl.$^6$ ............................................. H01M 10/46
[52] U.S. Cl. ................................. 320/15; 320/6; 320/22
[58] Field of Search ................................ 320/5, 6, 15, 20, 320/21, 22, 23

[56] References Cited

U.S. PATENT DOCUMENTS

| | | | |
|---|---|---|---|
| 3,911,350 | 10/1975 | Swope | 320/22 |
| 4,350,946 | 9/1982 | Prinsze . | |
| 5,028,859 | 7/1991 | Johnson et al. | 320/15 |
| 5,121,047 | 6/1992 | Goedken et al. | 320/39 |
| 5,122,722 | 6/1992 | Goedken et al. | 320/22 |
| 5,229,705 | 7/1993 | Kato | 320/20 |
| 5,311,112 | 5/1994 | Creaco et al. | 320/15 |
| 5,357,187 | 10/1994 | Park | 320/20 |
| 5,371,454 | 12/1994 | Marek | 320/15 |
| 5,420,493 | 5/1995 | Hargadon et al. | 320/15 |
| 5,483,144 | 1/1996 | Marek | 320/2 |

*Primary Examiner*—Adolf Berhane
*Assistant Examiner*—Patrick B. Law
*Attorney, Agent, or Firm*—Robert E. Bushnell, Esq.

[57] ABSTRACT

A dual mode battery charging device for charging a plurality of batteries includes a battery charging section for charging the batteries, and a charging control section for changing the switching period of a charging signal in the battery charging section in accordance with the number of batteries to be charged and outputs a control signal to the battery charging section which determines whether the charging section operates in a standard charging mode or a quick charging mode. In accordance with the number of batteries mounted, only one battery can be quickly charged or two batteries can be simultaneously charged at a normal speed. Therefore, the capacity of a battery and its available time increase.

14 Claims, 4 Drawing Sheets

| ⓒ | ⓓ | ⓐ | ⓑ | First Battery B41 | Second Battery B42 |
|---|---|---|---|---|---|
| High | Low | High | Low | Quick Charging | Not Charging |
| Low | High | Low | High | Not Charging | Quick Charging |
| High | High | High | High | Normal Charging | Normal Charging |
| Low | Low | Low | Low | Not Charging | Not Charging |

Fig. 4

DUAL BATTERY CHARGING DEVICE

CLAIM OF PRIORITY

This application makes reference to, incorporates the same herein, and claims all benefits accruing under 35 U.S.C. §119 from an application for *A Dual Battery Charging Device* earlier filed in the Korean Industrial Property Office on 30 Oct. 1995 and there duly assigned Ser. No. 38055/1995.

BACKGROUND OF THE INVENTION

1. Field of the Invention

The present invention relates to a dual mode battery charging device, and more particularly, to a dual mode battery charging device for a system such as a portable computer for quickly charging one battery or for simultaneously charging two batteries at a normal speed.

2. Description of the Related Art

In an earlier battery charging device, a battery to be charged was connected to a battery charging circuit including a charging circuit section for charging the battery and a charging save control section which allows an operator to select either a standard charging or a quick charging of the battery through the charging circuit. In this earlier battery charger, only one battery at a time could be charged and the speed of the battery charging was determined manually by the operator.

U.S. Pat. No. 5,483,144 to Marek entitled *Passive Battery Charging System*, U.S. Pat. No. 5,420,493 to Hargadon et al. entitled *Power Supply And Battery Charger*, U.S. Pat. No. 5,371,454 to Marek for a *Passive Battery Charging System*, U.S. Pat. No. 5,311,112 to Creaco et al. for a *Automatic Battery Charging System*, U.S. Pat. No. 5,357,187 to Park entitled *Automatic continuous Rapid Charging Circuit For Rechargeable Batteries, And Method Thereof*, U.S. Pat. No. 5,122,722 to Goedken et al. entitled *Battery Charging System*, U.S. Pat. No. 5,121,047 to Goedken et al. entitled *Battery Charging System*, U.S. Pat. No. 5,028,859 to Johnson et al. entitled *Multiple Battery, Multiple Rate Battery Charger*, U.S. Pat. No. 4,350,946 to Prinsze entitled *Multiple Constant Current Battery Charging Apparatus*, U.S. Pat. No. 3,911,350 to Swope for a *Dual Battery Charging Rate Device*, provide exemplars of the various efforts in the art to enhance the charging of batteries. I have found however, that a need exists for a circuit able to tailor the performance of the circuit to the load of unchanged or partially charged batteries installed across the charging terminals of the circuit.

SUMMARY OF THE INVENTION

Accordingly, the object of the present invention is to provide an improved battery charging circuit.

It is another object to provide a dual mode battery charging device for a system such as a portable computer, able to increase the capacity of a battery and the available duration for discharge by quickly charging the battery when only one battery is mounted in the system and by simultaneously charging two batteries at a normal speed when two batteries are mounted in the system.

It is still another object to provide a battery charging circuit able to tailor its operational performances to the load of discharged or partially charged batteries to be re-charged by the circuit.

To achieve these and other objects object and in accordance with the principles of the invention, as embodied and broadly described herein, a dual mode battery charging device for charging a plurality of batteries is provided with a battery charging section for charging the batteries and a charging control section that changes the switching period of a charging signal in the battery charging section in accordance with the number of batteries being charged, and outputs a control signal to the battery charging section which determines whether the charging section will operate in a standard charging mode or in a quick charging mode.

The above-cited object may be effected by providing a computer system having a dual mode battery charging device for charging a pair of batteries, comprising: an AC/DC converter for outputting a DC voltage a battery charging section having an output connectable to apply potential differences across a pair of electrically isolated batteries, said battery charging section receiving said DC voltage output by said AC/DC converter; a first receiving means for receiving an electrically connecting a first of the pair of batteries to be charged to said battery charging section; a second receiving means for receiving an electrically connecting a second of the pair of batteries to be charged to said battery charging section; and a charging controller for controlling the charging rate of said battery charging section such that said battery charging section operates in a quick charging mode when only one of said first and second receiving means has received a battery to be charged and operates in a standard charging mode when both said first and second battery receiving means have received batteries to be charged, the battery charging device charging the single battery in a quick charging mode faster than when it charges the pair of batteries in a standard charging mode.

Additional objects and advantages of the invention are set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is a diagram illustrating the operational charging states of a dual mode battery charging device in accordance with a preferred embodiment of the present invention.

DETAILED DESCRIPTION OF THE PREFERRED EMBODIMENT

Reference will now be made in detail to the preferred embodiment of the present invention, an example of which is illustrated in the accompanying drawings.

Figure 1:
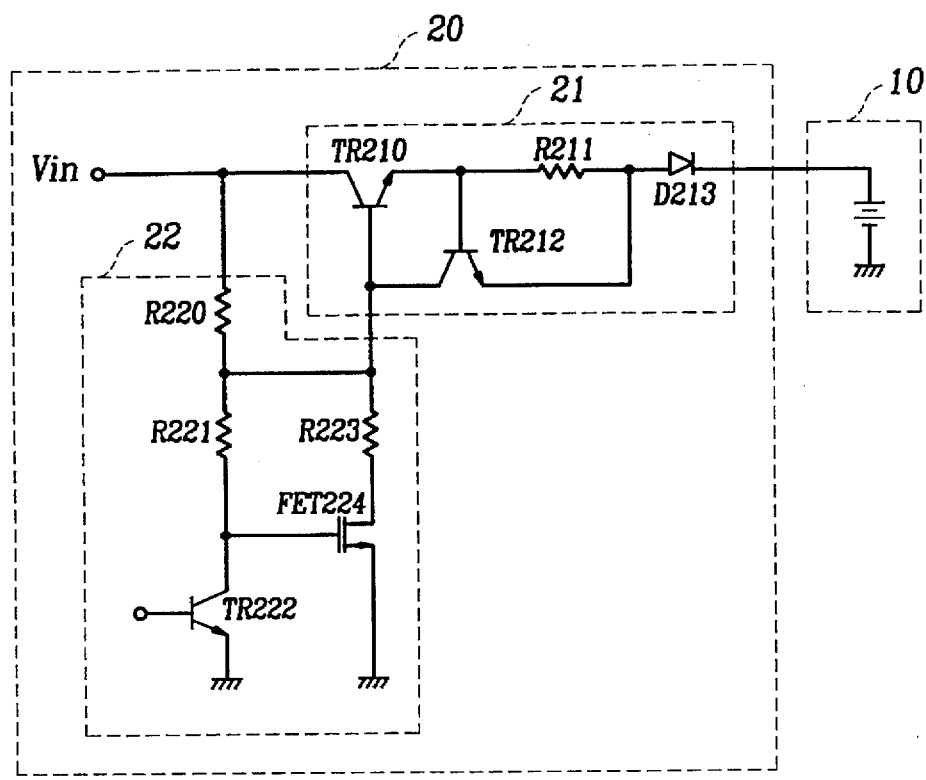
FIG. 1 is a schematic diagram illustrating a circuit for an earlier battery charging device.

An earlier battery charging device is explained in detail below with reference to FIG. 1. As shown in FIG. 1, a battery 10 to be charged is connected to a battery charging section 20 for charging the battery 10. The battery charging section 20 includes a charging circuit section 21 for charging the battery 10 and a charging-state control section 22 which selects standard-charging or quick charging through the charging circuit 21. The charging circuit 21 is constructed with a first transistor TR210 having a collector terminal connected to a power input terminal Vin and a base terminal connected to the charging-state control section 22; a first resistor R211 having one terminal connected to an emitter terminal of the first transistor TR210; a second transistor TR212 having a collector terminal connected to the base terminal of the first transistor TR210, a base terminal connected to the emitter terminal of the first transistor TR210 and an emitter terminal connected to the other terminal of the first resistor R211; and a diode D213 having an anode terminal connected to the other terminal of the first resistor R211 and a cathode terminal connected to the battery 10.

The charging-state control section 22 is constructed with a second resistor R220 having one terminal connected to the power input terminal Vin and the other terminal connected to the base terminal of the first transistor TR210 in the charging circuit section 21; a third resistor R221 having one terminal connected to the other terminal of the second resistor R220; a third transistor TR222 having a collector terminal connected to the other terminal of the third resistor R221 and an emitter terminal which is grounded; a fourth resistor R223 having one terminal connected to the base terminal of the first transistor TR210 in the charging section 21; and a field effect transistor FET 224 having a drain terminal connected to the other terminal of the fourth resistor R223, a gate terminal connected to the collector terminal of the third transistor TR222 and a source terminal connected to a local reference potential.

In the operation of the battery charging device represented by FIG. 1, a battery 10 to be charged is mounted and a high signal is provided to the third transistor TR222. A voltage divided by the second resistor R220 and the third resistor R221 turns ON the first transistor TR210 when the high signal is sent to the third transistor TR222. The third resistor R221 is a resistor for making the first transistor TR210 reach a saturation area, and has a much larger resistance than that of the second resistor R220. When the first transistor TR210 reaches the saturation area, the charging section 21 charges the battery 10 quickly because a current nearly equal to Vin+R220 flows in the first resistor R211.

On the other hand, when a low signal is sent to the third transistor TR222, the field effect transistor FET224 is turned ON and the voltage divided by the second resistor R220 and the fourth resistor R223 turns ON the first transistor TR210. The fourth resistor R223 is the resistor for making the first transistor TR210 reach an active area, and is only slightly higher than that of the first resistor R220. When the first transistor TR210 reaches the active area, normal rather than high speed charging is performed because a smaller current flows in the first resistor R211. I have found however, the earlier battery charger can charge only one battery at a time and has a capacity limitation that restricts the available time that the battery is available to power a load.

Figure 2:
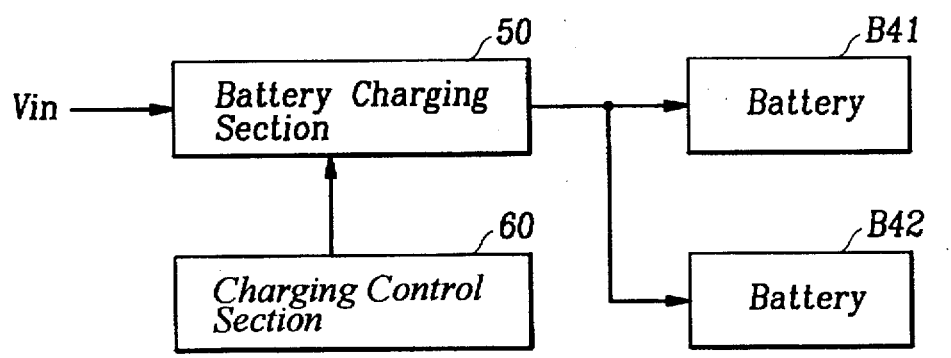
FIG. 2 is a block diagram illustrating a dual mode battery charging device constructed in accordance with a preferred embodiment of the present invention.
Figure 3:
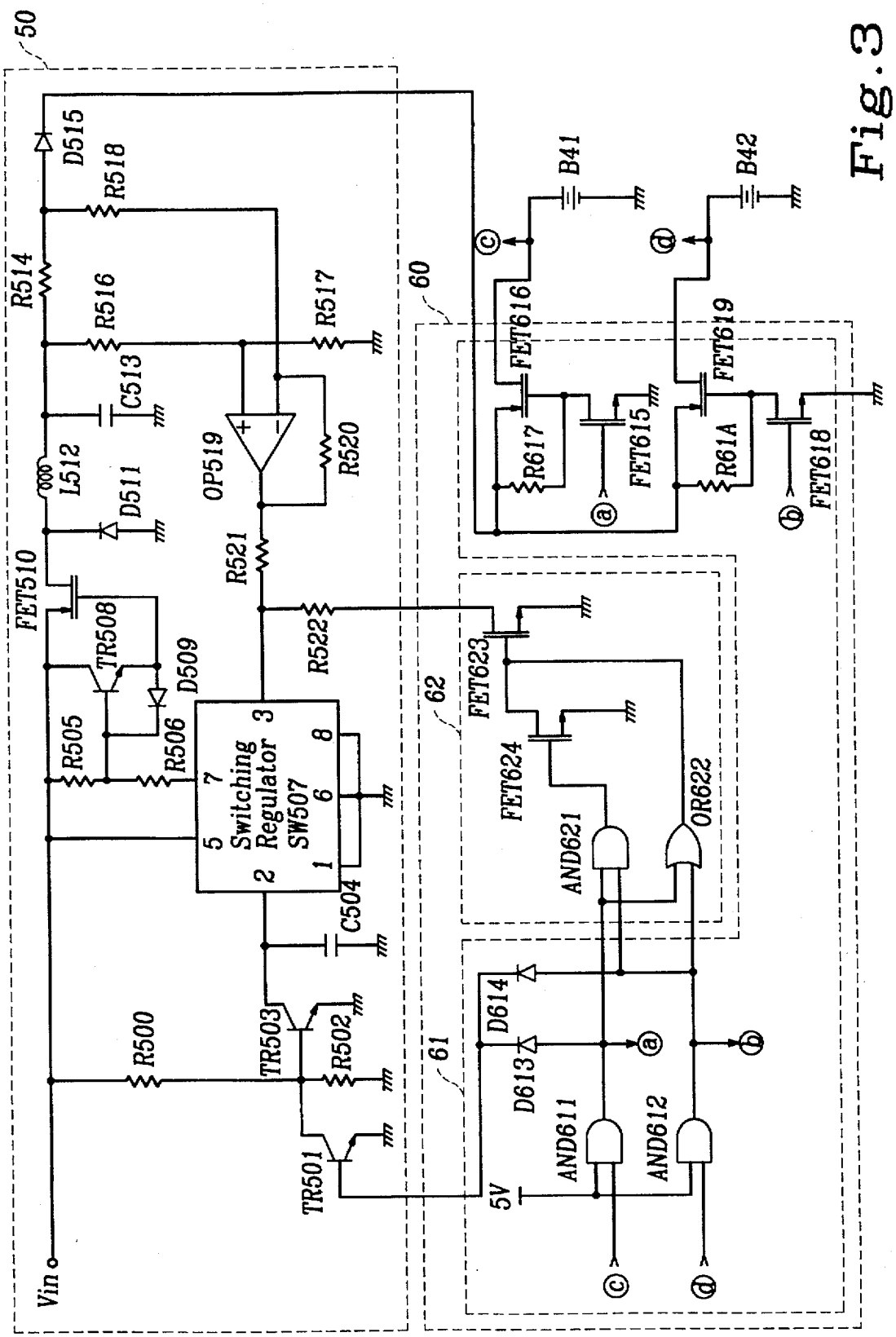
FIG. 3 is a detailed schematic diagram illustrating a circuit for a dual mode battery charging device constructed in accordance with a preferred embodiment of the present invention.

Referring now to FIG. 2, a dual mode battery charging device constructed as a preferred embodiment of the present invention is able to receive and charge a plurality of batteries, B41 and B42. Battery charging section 50 for charges batteries B41 and B42 while charging control section 60 changes a switching period of a charging signal and outputs a control signal corresponding to the switching period. Battery charging section 50 performs a quick or normal charging according to the number of batteries being charged.

The battery charging section 50 includes a first resistor R500 having one terminal connected to a power input terminal Vin; a first transistor TR501 having a collector terminal connected to the other terminal of the resistor R500, a base terminal connected to the charging control section 60 and an emitter terminal which is grounded; a second resistor R502 having one terminal connected to the collector terminal of the first transistor TR501 and having the other terminal grounded; a second transistor TR503 having a base terminal connected to the collector terminal of the first transistor TR501 and an emitter terminal which is grounded; a first capacitor C504 having one terminal connected to a collector terminal of the second transistor TR503 and having the other terminal grounded; a third resistor R505 having one terminal connected to the power input terminal Vin; a fourth resistor R506 having one terminal connected to the other terminal of the third resistor R505; a switching regulator SW507 having a fifth terminal connected to the power input terminal Vin and a second terminal connected to one terminal of the first capacitor C504, and a first terminal, a sixth terminal and an eighth terminal which is grounded; a third transistor TR508 having a collector terminal connected to one terminal of the third resistor R505 and a base terminal connected to one terminal of the fourth resistor TR506; a first diode D509 having a cathode terminal connected to the base terminal of the third transistor TR508 and an anode terminal connected to an emitter terminal of the third transistor TR508; a field effect transistor FET510 having a drain terminal connected to the collector terminal of the third transistor TR508 and a gate terminal connected to the emitter terminal of the third transistor TR508; a second diode D511 having a cathode terminal connected to a sottree terminal of the first field effect transistor FET510 and an anode terminal which is grounded; a coil L512 having one terminal connected to the cathode terminal of the second diode D511; a second capacitor C513 having one terminal connected to the other terminal of the coil L512 and having the other terminal grounded; a fifth resistor R514 having one terminal connected to the other terminal of the coil L512; a third diode D515 having an anode terminal connected to the other terminal of the fifth resistor R514 and a cathode terminal connected to the battery; a sixth resistor R516 having one terminal connected to the other terminal of the fifth resistor R514; a seventh resistor R517 having one terminal connected to the other terminal of the sixth resistor R516 and having the other terminal grounded; an eighth resistor R518 having one terminal connected to the other terminal of the fifth resistor R514; an operational amplifier OP519 having a non-inverting input terminal connected to one terminal of the seventh resistor R517 and having an inverting input terminal connected to the other terminal of the eighth resistor R518; a ninth resistor R520 having one terminal connected to an output terminal of the operational amplifier OP519 and the other terminal connected to the inverting input terminal of the operational amplifier OP519; a tenth resistor R521 having one terminal connected to the output terminal of the operational amplifier OP519 and the other terminal connected to a third terminal of the switching regulator SW507; and an eleventh resistor R522 having one terminal connected to one terminal of the tenth resistor R521 and the other terminal connected to the charging control section.

The charging control section 60 includes a charging circuit controller 61 for controlling the battery charging section 50 whose operation state is changed in accordance with the number of batteries to be charged; a charging state controller 62 for changing a charging speed of the battery charging section 50 by changing a charging switching period of the battery charging section 50 in accordance with a control signal supplied from the charging circuit controller 61.

The charging circuit controller 61 includes a first AND gate AND611 having a first input terminal connected to a voltage 5V and a second input terminal connected to the first battery B41; a second AND gate AND612 having a first input terminal connected to the voltage 5V and a second input terminal connected to the second battery B42; a fourth diode D613 having an anode terminal connected to an output terminal of the first AND gate AND611 and a cathode terminal connected to a base terminal of the first transistor TR501 in the battery charging section 50, and for allowing the battery charging section 50 to charge the first battery B41; a fifth diode D614 having an anode terminal connected to an output terminal of a second AND gate AND612 and a cathode terminal connected to a base terminal of the first transistor TR501 in the battery charging section 50, and for allowing the battery charging section 50 to charge the second battery B42; a fourth field effect transistor FET615 having a gate terminal connected to the output terminal of the first AND gate AND611 and a source terminal which is grounded; a fifth field effect transistor FET616 having a gate terminal connected to a drain terminal of the fourth field effect transistor FET615 and the cathode terminal of the third diode D515 in the battery charging section 50 connected to a drain terminal thereof, and a source terminal connected to the first battery B41; a twelfth resistor R617 having one terminal connected to a drain terminal of the fifth field effect transistor FET616 and the other terminal connected to the drain terminal of a fourth field effect transistor FET615; a sixth field effect transistor FET618 having a gate terminal connected to the output terminal of a second AND gate AND612 and a source terminal which is grounded; a seventh field effect transistor FET619 having a gate terminal connected to a drain terminal of the sixth field effect transistor FET618 and a drain terminal connected to the cathode terminal of the third diode D515 in the battery charging section 50, and a source terminal connected to the second battery B42; a thirteenth resistor R61A having one terminal connected to a drain terminal of the seventh field effect transistor FET619 and the other terminal connected to a drain terminal of the sixth field effect transistor FET618.

A charging state controller 62 includes a third AND gate AND612 having a first input terminal connected to the output terminal of a first AND gate AND611 in the charging circuit controller 61 and a second input terminal connected to the output terminal of the second AND gate AND612 in the charging circuit controller 61; a first OR gate OR622 having a first input terminal connected to the output terminal of a first AND gate AND611 in the charging circuit controller 61 and a second input terminal connected to the output terminal of a second AND gate AND612 in the charging circuit controller 61; a second field effect transistor FET623 having a gate terminal connected to an output terminal of a first OR gate OR622, a drain terminal connected to a eleventh resistor R522 in the battery charging section 50 and a source terminal which is grounded; and a third field effect transistor FET624 having a gate terminal connected to an output terminal of a third AND gate AND621, a drain terminal connected to a gate terminal of the second field effect transistor FET 623 and a source terminal electrically connected to a local reference potential such as a circuit ground.

The operation of the dual mode battery charging device in accordance with the preferred embodiment of the present invention is explained as follows.

When power is applied to the battery charging section 50 from the power input terminal Vin and only the first battery B41 is to be charged, a high level signal is supplied to the second input terminal of the first AND gate AND611 by a residual voltage of the first battery B41 when the first battery B41 is mounted. When the high level signal is supplied to the second input terminal of the first AND gate AND611, the first AND gate AND611 outputs the high level signal. The high level signal outputted by the first AND gate AND611 turns ON the fourth field effect transistor FET615 thereby turning ON the filth field effect transistor FET616 which allows the first battery B41 to be charged. At the same time, the high level signal outputted from the first AND gate AND611 turns ON the third diode D613. When the fourth diode D613 is turned ON, the first transistor TR501 of the battery charging section 50 is turned ON and turns OFF the second transistor TR503. When the transistor TR503 is turned OFF, the switching regulator SW507 begins to operate and outputs the switching voltage from a seventh terminal.

By the switching voltage outputted from the seventh terminal in the switching regulator SW507, the third transistor TR508 repeats the ON/OFF operation and makes the first field effect transistor FET510 perform the switching operation. The voltage switched ON by the first field effect transistor FET510 charges the first battery B41 with a constant voltage and current by a filter having the second diode D511, the coil L512 and the second capacitor C513. At this time, the first OR gate OR622 receives the high level signal outputted from the first AND gate AND611 through a first input terminal and outputs the high level signal thereby turning ON the second field effect transistor FET623.

When the field effect transistor FET623 is mined ON, an operational amplifier OP519, which inputs the voltage of both terminals of the fifth resistor R514 to a non-inverting input terminal and an inverting input terminal and outputs the amplified voltage. The amplified output voltage is then divided by the tenth resistor R521 and the eleventh resistor R522. The divided voltage is inputted to the third terminal of the switching regulator SW507 and the switching regulator SW507 allows the first battery B41 to be quickly charged.

Also, if only the second battery B42 is being charged, the operation is identical to the charging of only the first battery B41. When the first battery B41 and the second battery B42 are both being charged however, the first AND gate AND611 outputs the high level signal by a residual voltage of the first battery B41 and the second AND gate AND612 outputs the high level signal by a residual voltage of the second AND gate AND612. When the high level signal outputted from the first AND gate AND611 turns ON the fourth field effect transistor FET615, the fifth field effect transistor FET616 is mined ON, which allows the first battery B41 to be charged. Also, the high level signal outputted from the second AND gate AND612 turns ON the sixth field effect transistor FET618, the seventh field effect transistor FET619 is turned ON which allows the second battery B42 to be charged. At the same time, each high level signal outputted from the first AND gate AND611 and the second AND gate AND612 turns ON the fourth diode D613 and the fifth diode D614 respectively. After the fourth diode D613 and the fifth diode D614 are turned ON, the first transistor TR501 in the battery charging section 50 is mined ON and turns OFF the second transistor TR503. After the second transistor TR503 is turned OFF, the switching regulator SW507 outputs a switching voltage from a seventh terminal.

By the switching voltage from the seventh terminal of the switching regulator SW507, the third transistor TR508 repeats the ON/OFF operation, and thereby making the first field effect transistor TR510 perform the switching operation. The voltage switched ON by the first field effect transistor TR508 charges the first battery B41 and the second battery B42 with constant voltage and current by a filter having the second diode D511, the coil L512 and the second capacitor C513. At this time, the high level signal outputted from the first AND gate AND611 is inputted to a first input terminal of the third AND gate AND621. The high level signal outputted from the second AND gate AND612 is inputted to the second input terminal of the third AND gate AND612, and the third AND gate AND621 outputs the high level signal and turns ON the third field effect transistor FET624.

When the third field effect transistor FET624 is turned ON, the second field effect transistor FET623 is turned OFF regardless of the output signal of the first OR gate OR622. When the second field effect transistor FET623 is turned OFF, the output voltage of the operational amplifier OP519, for sensing the voltage of both terminals of the fifth resistor R514 by the non inverting input terminal and the inverting input terminal and outputting the amplified voltage, is not divided by the eleventh resistor R522. The output voltage of the operational amplifier OP519 is directly inputted to a third terminal of the switching regulator SW507 and the switching regulator SW507 allows the first battery B41 and the second battery B42 to be simultaneously charged at a normal speed. The switching regulator SW507 is not restricted to a regulator manufactured by a particular company and an suitable regulator can be used by connecting the proper terminals to the peripheral circuits.

Figure 5:
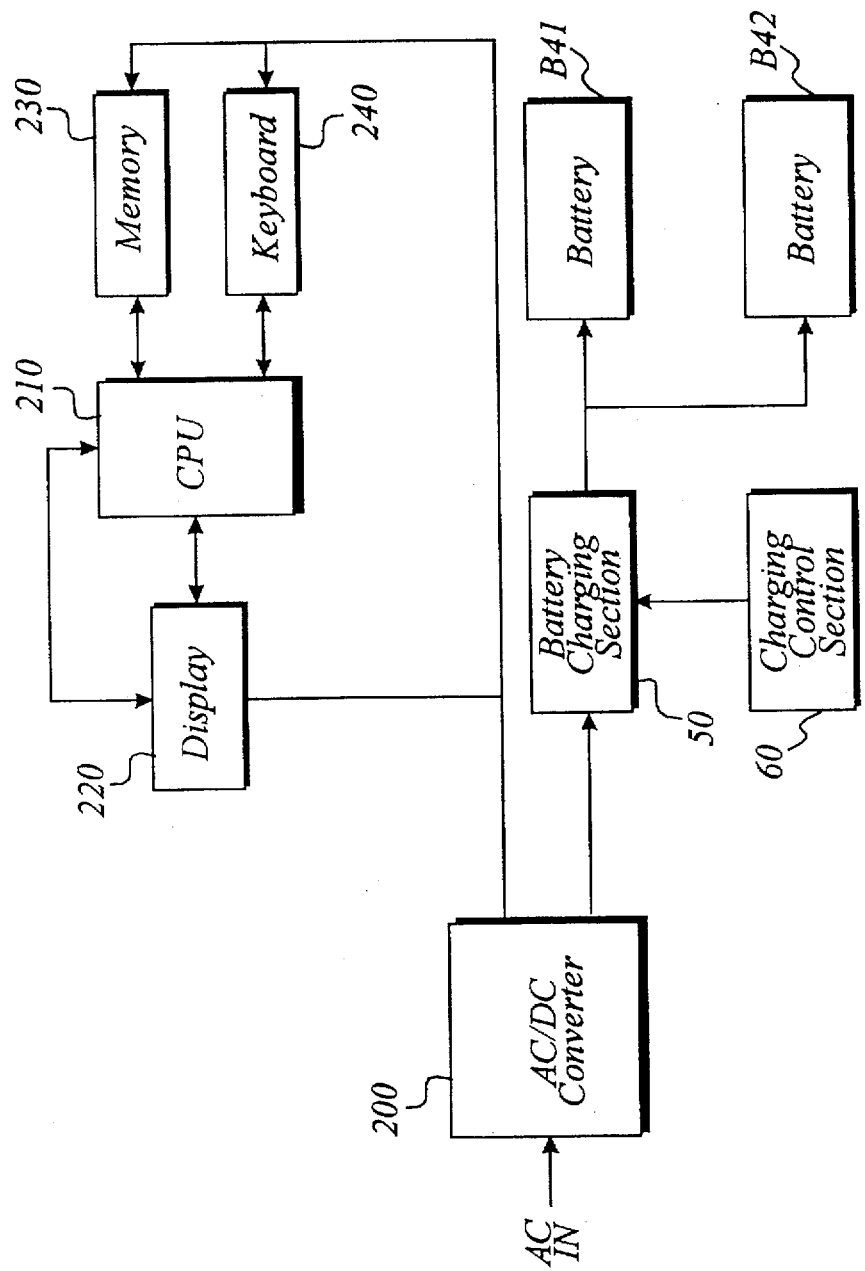
FIG. 5 is a block diagram of a dual battery charging device constructed in accordance with a preferred embodiment of the present invention and incorporated in a computer.

FIG. 5 is a block diagram of a dual mode battery charging device constructed in accordance with a preferred embodiment of the present invention and incorporated in a computer.

The computer includes a AC/DC converter 200 for receiving an AC input and for converting it into a DC voltage $V_+$ for use by the computer and for generating $V_i$ and for operating the dual mode battery charging device.

The computer includes a central processing unit (CPU) 210 connected a memory 230 and keyboard 240 and display 220.

The dual mode battery charger includes a battery charging section 50 and charging control section 60 and can charge either a single battery B41 or dual batteries including battery B41 and battery B42.

The arrangement illustrated in FIG. 5 allows the charging of either a single battery or two batteries during the AC operation of the computer.

The computer is operated using a battery in the absence of AC power, the battery voltage being applied to the computer elements either by the operation of a switch (not shown) or by physically moving the battery from its charging portion in the battery charger to a separate physical location where it is connected to the computer to supply power thereto.

The present invention relates to a dual mode battery charging device. A dual mode battery charging device for a system such as a portable computer can increase the capacity of a battery and its available time by quickly charging the battery when one battery is mounted in the system or simultaneously charging two batteries at a normal speed when two batteries are mounted in the system. It is apparent therefore, that the practice of the present invention increases the total battery charge capacity and thereby increases the period of time during which the charged batteries are available for use.

What is claimed is:

1. A dual mode battery charging device, comprising:
   a battery charging section having output connectable to apply potential differences across a plurality of electrically isolated batteries; and
   a charging control section which changes a charging switching period of a charging signal in the battery charging section in accordance with the number of batteries being charged, and outputs a control signal to the battery charging section to place operation of said charging section in one of a standard charging mode and a quick charging mode.

2. A dual mode battery charging device according claim 1, said charging control section comprising:
   a charging circuit controller for controlling the mode of said battery charging section in accordance with the number of batteries being charged by said battery charging section; and
   a charging state controller for changing a charging speed of the battery charging section by changing said charging switching period of the battery charging section in accordance with the number of batteries being charged when the battery charging section charges batteries according to said control signal supplied from the charging circuit controller.

3. A dual mode battery charging device according to claim 2, wherein said charging circuit controller comprises:
   a first AND gate whose output state is changed by an input signal from a first battery being charged;
   a second AND gate whose output state is changed by an input signal from a second battery being charged;
   a controller connected to said first AND gate and second AND gate for providing said battery charging device with output signals of said first and second AND gates in accordance with the number of batteries being charged;
   a first switch whose electrical conduction state is changed by an output signal of said first AND gate, and controls a charging current to said first battery from said battery charging device; and
   a second switch whose electrical conduction state is changed by an output signal of said second AND gate, and controls a charging current to said second battery from said battery charging device.

4. A dual mode battery charging device according claim 3, wherein said charging state controller comprises:
   a third AND gate whose output state is changed by output signals of said first and second AND gates in said charging control section;
   a first OR gate whose output state is changed by output signals of said first and second AND gates in said charging control section;
   a third switch whose electrical conduction state is changed by an output signal of said first OR gate and allows a battery being charged by said battery charging device to be quickly charged; and
   a fourth switch whose electrical conduction state is changed by an output signal of said third AND gate and allows a battery being charged by said battery charging device to be charged at a normal speed.

5. A dual mode battery charging device for charging a pair of batteries, comprising:

a battery charging section having an output connectable to apply potential differences across a pair of electrically isolated batteries; and a charging control section for controlling a charging rate of said battery charging section such that said battery charging section operates in a quick charging mode when only one battery is being charged by the charging device and operates in a standard charging mode when two batteries are being charged by the charging device.

6. A dual mode battery charging device according to claim 5, said charging control section comprising:

a charging circuit controller for controlling the mode of said battery charging section in accordance with the number of batteries being charged by said battery charging section; and a charging state controller for changing a charging speed of the battery charging section by changing a charging switching period of the battery charging section in accordance with the number of batteries being charged when the battery charging section charges one or two batteries according to a control signal supplied from the charging circuit controller.

7. A dual mode battery charging device according to claim 6, wherein said charging circuit controller comprises:

a first AND gate whose output state is changed by an input signal from a first battery being charged;

a second AND gate whose output state is changed by an input signal from a second battery being charged;

a controller connected to said first AND gate and second AND gate for providing said battery charging device with output signals of said first and second AND gates in accordance with the number of batteries being charged;

a first switch whose electrical conduction state is changed by an output signal of said first AND gate, and controls a charging current to said first battery from said battery charging device; and a second switch whose electrical conduction state is changed by an output signal of said second AND gate, and controls a charging current to said second battery from said battery charging device.

8. A dual mode battery charging device according to claim 7, wherein said charging state controller comprises:

a third AND gate whose output state is changed by output signals of said first and second AND gates in said charging control section;

a first OR gate whose output state is changed by output signals of said first and second AND gates in said charging control section;

a third switch whose electrical conduction state is changed by an output signal of said first OR gate and allows a battery being charged by said battery charging device to be quickly charged; and a fourth switch whose electrical conduction state is changed by an output signal of said third AND gate and allows a battery being charged by said battery charging device to be charged at a normal speed.

9. A dual mode battery charging device for charging a pair of batteries, comprising:

a battery charging section having an output connectable to apply potential differences across a pair of electrically isolated batteries;

a first receiving means for receiving and electrically connecting a first of the pair of batteries to be charged to said battery charging section;

a second receiving means for receiving and electrically connecting a second of the pair of batteries to be charged to said battery charging section; and a charging control section for controlling a charging rate of said battery charging section such that said battery charging section operates in a quick charging mode when only one of said first and second receiving means has received a battery to be charged and operates in a standard charging mode when both said first and second battery receiving means have received batteries to be charged, the battery charging device charging the single battery in a quick charging mode faster than when it charges the pair of batteries in a standard charging mode.

10. A dual mode battery charging device according to claim 9, wherein said charging circuit controller comprises:

a first AND gate whose output state is changed by an input signal from a first battery being charged;

a second AND gate whose output state is changed by an input signal from a second battery being charged;

a controller connected to said first AND gate and second AND gate for providing said battery charging device with output signals of said first and second AND gates in accordance with the number of batteries being charged;

a first switch whose electrical conduction state is changed by an output signal of said first AND gate, and controls a charging current to said first battery from said battery charging device; and a second switch whose electrical conduction state is changed by an output signal of said second AND gate, and controls a charging current to said second battery from said battery charging device.

11. A dual mode battery charging device according claim 10, wherein said charging state controller comprises:

a third AND gate whose output state is changed by output signals of said first and second AND gates in said charging control section;

a first OR gate whose output state is changed by output signals of said first and second AND gates in said charging control section;

a third switch whose electrical conduction state is changed by an output signal of said first OR gate and allows a battery being charged by said battery charging device to be quickly charged; and a fourth switch whose electrical conduction state is changed by an output signal of said third AND gate and allows a battery being charged by said battery charging device to be charged at a normal speed.

12. A computer system having a dual mode battery charging device for charging a pair of batteries, comprising:

an AC/DC converter for outputting a DC voltage;

a battery charging section having an output connectable to apply potential differences across a pair of electrically isolated batteries, said battery charging section receiving said DC voltage output by said AC/DC converter;

a first receiving means for receiving and electrically connecting a first of the pair of batteries to be charged to said battery charging section;

a second receiving means for receiving and electrically connecting a second of the pair of batteries to be charged to said battery charging section; and a charging control section for controlling a charging rate of said battery charging section such that said battery charging section operates in a quick charging mode when only one of said first and second receiving means has received a battery to be charged and operates in a standard charging mode when both said first and second battery receiving means have received batteries to be charged, the battery charging device charging the single battery in a quick charging mode faster than when it charges the pair of batteries in a standard charging mode.

13. The computer system having a dual mode battery charging device according to claim 12, wherein said charging circuit controller comprises:

a first AND gate whose output state is changed by an input signal from a first battery being charged;

a second AND gate whose output state is changed by an input signal from a second battery being charged;

a controller connected to said first AND gate and second AND gate for providing said battery charging device with output signals of said first and second AND gates in accordance with the number of batteries being charged;

a first switch whose electrical conduction state is changed by an output signal of said first AND gate, and controls a charging current to said first battery from said battery charging device; and a second switch whose electrical conduction state is changed by an output signal of said second AND gate, and controls a charging current to said second battery from said battery charging device.

14. The computer system having a dual mode batttery charging device according to claim 13, wherein said charging state controller comprises:

a third AND gate whose output is changed by output signals first and second AND gates in said charging control section;

a first OR gate whose output state is changed by output signals of said first and second AND gates in said charging control section;

a third switch whose electrical conduction state is changed by an output signal of first OR gate and allows a battery being charged by said battery charging device to be quickly charged; and a fourth switch whose electrical conduction state is changed by an output signal of said third AND gate and allows a battery being charged by said battery charging device to be charged at a normal speed.

* * * * *